Figure 1:
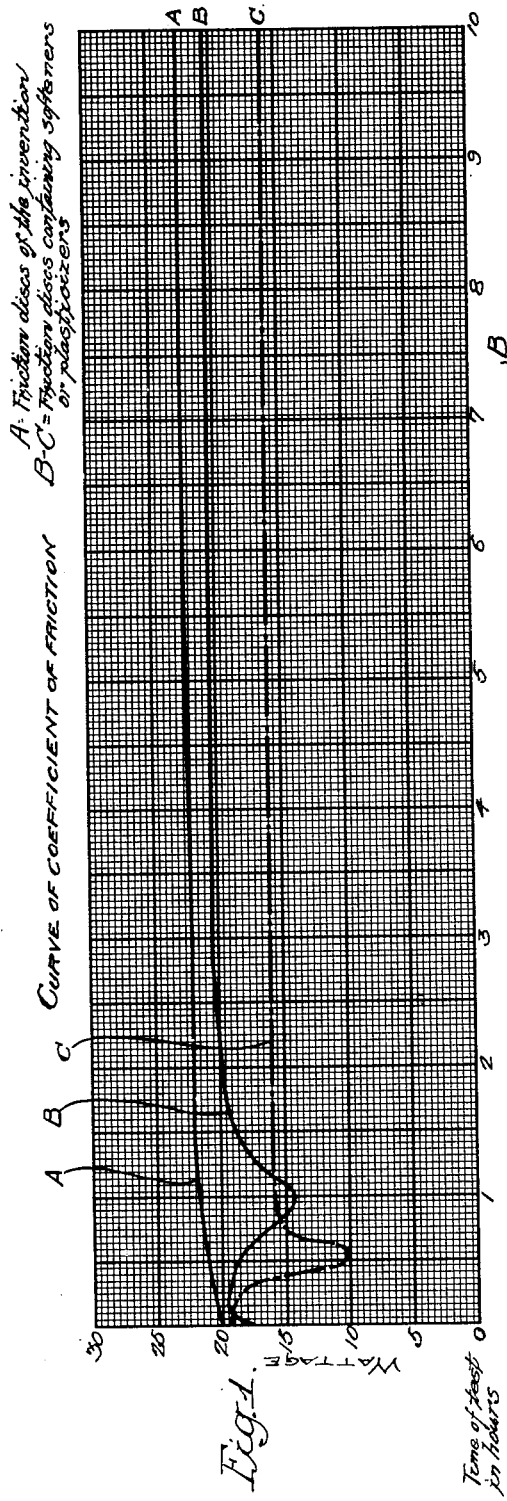

July 18, 1933.　　　　R. W. KENT　　　　1,919,111

FRICTION DISKS AND METHOD OF MAKING THE SAME

Filed Dec. 16, 1931

Inventor:
Raymond W. Kent
by his Attorneys
Howson & Howson

Patented July 18, 1933

1,919,111

UNITED STATES PATENT OFFICE

RAYMOND W. KENT, OF NEWTON, MASSACHUSETTS, ASSIGNOR TO THERMOID RUBBER COMPANY, OF TRENTON, NEW JERSEY, A CORPORATION OF NEW JERSEY

FRICTION DISKS AND METHOD OF MAKING THE SAME

Application filed December 16, 1931. Serial No. 581,473.

My invention relates to a novel process of compounding rubber and fibre, and to the resulting product. More particularly, it relates to a method of producing fibrous rubber compositions in which a relatively large amount of fibre is intimately combined with the rubber and uniformly distributed therethrough. It also relates to a novel fibrous rubber composition in which the major portion of the composition consists of fibrous ingredients, and, therefore, it is particularly applicable for use for friction purposes, for example, in brake linings, clutch rings, and other friction disks, or plates.

One object of my invention is to provide a method of combining rubber and fibre by which it is possible to incorporate in the rubber, without the addition of extraneous materials, a greater proportion of fibre than has heretofore been possible.

Another object of my invention is to provide a process by which large quantities of fibre may be incorporated easily, effectively and homogeneously with the rubber, and in which the use of all other materials with the rubber and fibre, except the usual inert minerals and vulcanizing materials, is entirely avoided.

Another object of my invention is to provide an improved and simplified procedure of producing a rubber-fibre product, in which process the rubber may be softened and incorporated with the rubber, sheeted out and vulcanized, without the use of special machinery, and without the use of solvents, water, softeners, plasticizers and the like.

A further object of my invention is to furnish a process for the compounding of rubber and fibre in which the danger of scorching or partial vulcanization of the rubber, which often occurs in mixing these two materials due to the generation of heat caused by friction, is eliminated.

Still another object of my invention is to provide novel friction materials for use as friction disks or plates, for example, as brake bands, clutch rings, and the like, which are capable of exerting a high uniform friction under all conditions of use, including the most severe, and which are relatively wear-resistant and consequently of long life.

Other advantages will be apparent from a consideration of the specification and claims.

For many purposes, particularly in the case of friction materials, it is desirable to have present with the rubber, a large amount of fibre such as cotton and asbestos fibre, or a mixture of both. Difficulty is encountered, however, in compounding a relatively large amount of fibre with the rubber, due to the fact that special means must be employed to aid in the assimilation of the fibre by the rubber for without the use of these special means the limit is soon reached where no more fibre can be incorporated.

Previously compounds containing a fairly high percentage of fibre have been produced by milling the rubber and fibre together with the addition of softeners or plasticizers, in an effort to facilitate the compounding. There are several disadvantages to such processes, for example, the fibrous material suffers considerable shortening in length due to the friction and mechanical break down developed during the processing; the excessive frictional heat developed often causes partial vulcanization or scorching of a portion of the rubber; and the bond between the rubber and the fibres is relatively weak as compared to the bond between individual particles of the rubber, so that the resulting fibrous product is less strong than a similar product made wholly of rubber. This process also requires the use of special machinery and equipment. A further disadvantage lies in the fact that such products containing softeners and plasticizers do not give consistent results and fail to maintain a uniform coefficient of friction under all conditions, due to the fact that the softeners or plasticizers tend to come to the surface of the product in use and lubricate it. This action is apt to be dangerous, for example, in the operation of an automobile with newly lined brakes employing such compounds, since a strong application of the brakes for a sufficient length of time may cause the softeners or plasticizers to sweat out and lubricate the surface of the brakes, in which case they will then fail to hold in the emergency. Also softeners or plasticizers tend to liberate gases at high temperatures with consequent separation and disintegration of the lining.

A number of the above-mentioned disadvantages has been eliminated by first treating the rubber with suitable solvents, and then mixing the resulting fluid material with the fibres. The solvents are thereafter removed prior to the production of the finished article. According to another known process, rubber is swelled and softened with water, and then incorporated with the fibres, and processed in a manner analogous to the manufacture of paper from pulp, by which the water is removed before the finished product is made. In either case, a good mixture of fibres and rubber is obtained and the objectionable lubrication of brakes or the like which contain softeners or plasticizers is avoided. However, each of these two processes requires special machinery in addition to that used regularly in rubber mills, and each is also attended by the necessity of removing the solvents or the water before the final product can be fabricated.

The process of my invention is characterized by its simplicity and its freedom from the disadvantages accompanying the prior process.

I have invented an improved and expedient procedure whereby the rubber may be softened, incorporated with the fibres, sheeted out, and vulcanized, without the use of special machinery and without the use of solvents or water. My process also avoids the use of special plasticizers or softeners and the products are not self-lubricating when subjected to severe conditions of use. According to my process, large quantities of fibre may be incorporated with the rubber easily, effectively and homogeneously, and the use, with the rubber and fibres of all other material except, of course, the usual pigments and vulcanizing material such as sulphur and graphite is entirely avoided.

Figure 2:
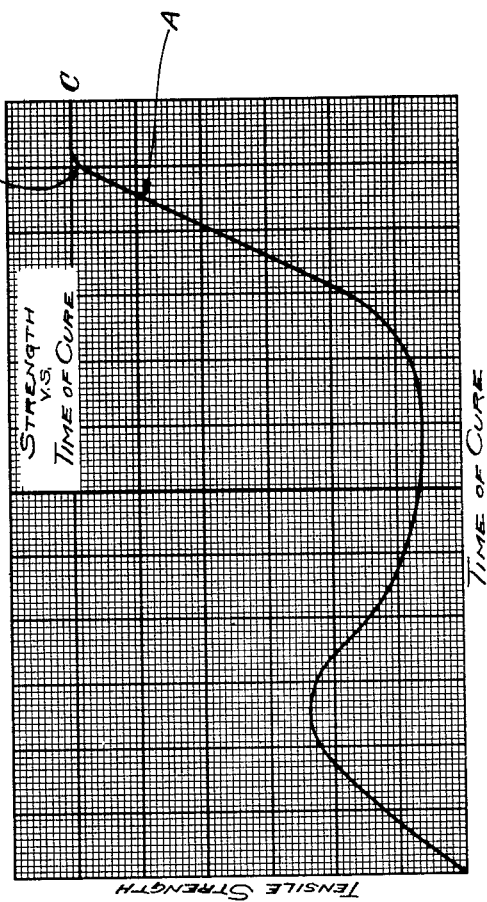

In connection with this specification, reference may be made to the drawing in which:

Figure 1 is a graph illustrating the results of tests for coefficient of friction upon friction disks and the like using plasticizers or softeners, and upon such disks made in accordance with my invention; and Figure 2 is a graph showing the effect of length of curing time upon tensile strength of the product of the present invention.

The process of my invention contemplates an initial heat treatment of the rubber to render it in the form of a honey-like mass, of relatively low viscosity, prior to the introduction of the fibres therein. The fluidity of the viscous mass of rubber is sufficiently high to allow the two materials to be thoroughly mixed together, producing a uniform homogeneous rubber fibre mass. The addition of the fibre to the rubber in this manner allows the incorporation of very large amounts of fibre and assures a uniform distribution of the fibre in the rubber mass. The process furnishes a product in which there is a very strong bond between the fibre and the rubber, due to the impregnation of the fibre by the rubber while of relatively low viscosity. Since the incorporation of the fibre in the rubber takes place while the rubber is relatively fluid, there is very little, if any, friction encountered, and, therefore, long fibres may be employed with an assurance that they will not be torn or damaged during the mixing; a very desirable feature since the long fibres give additional wearing qualities. The absence of appreciable friction and its accompanying heat also precludes the possibility of scorching or partial vulcanizing of the rubber. The final product of the present invention will stand up better in use, and will have a more uniform coefficient of friction under all conditions than a product in which softening or plasticizing agents are employed.

In carrying out the invention, practically any type of unvulcanized rubber may be employed. In view of the fact that cheaper grades of rubber are reduced to a fluid condition more readily by heat, and when eventually vulcanized, afford results which compare favorably with the higher and more expensive grades of rubber, it is possible to effect material economy by using the cheaper grades. It will, therefore, be noted that one of the advantages of the present invention lies in the fact that it permits the use of relatively low grade and cheap rubbers in the production of a high grade product. The rubber which may or may not have been previously milled is placed in a suitable heater and subjected to a sufficient temperature for a sufficient length of time to reduce it to a viscous mass. The exact time of heating and temperature of treatment may be varied widely and these variables are dependent to an extent one upon the other. They are also dependent to some extent upon the thickness of the mass and the type of rubber under treatment. These factors may be so chosen by the operator as to obtain the consistency of the rubber desired. In most instances, it will be desirable to heat the product at a temperature and for a time sufficient to bring it to the consistency of honey. For example, the rubber may be placed in a suitable heater (an electrically heated furnace), and subjected to a temperature from 350° F. upwards, (the maximum temperature employable being limited to temperatures below the flash point of the products of decomposition, for example, 600° F.) for from fifteen minutes to four hours, at which time it will have been reduced to a honey-like consistency. As an example, rubber sheets one-quarter inch thick have been reduced to the consistency of honey when treated at a temperature of 550° F. for twenty minutes. As an example of the use of lower temperatures, it has been found that if a temperature of 350° F. to 400° F. is employed, rubber of the consistency described will be obtained if the heating is carried out for a period of two and one-half to four hours. These examples illustrate the statement that the results obtained in the treatment are direct functions of the time and temperature at which the process is carried out. The temperature may remain substantially constant throughout the process, for example, at 550° F., or the heating may be started at a lower temperature, say 200° F. and increased gradually or by steps until the desired high temperature is reached. Pressure may be employed within the heating chamber if desired; for example, steam pressure may be used varying anywhere from just above atmospheric pressure upwards, for example, up to 150 pounds per square inch. The exact time and temperature of treatment to be employed in any given case is readily determinable by the operator who should carry out the heating step until the rubber has reached the desired honey-like consistency.

After the heating as described, the honey-like product is ready for incorporation with the fibres. Asbestos fibre is preferred, due to its wear-resisting qualities, but in some instances it will be found desirable to use cotton fibre alone, or a mixture of asbestos and cotton fibre. In the case of the use of a mixture of fibres, it is generally preferable to have a predominance of asbestos fibres. The rubber and fibre are mixed in any suitable mixer such as the Banbury mixer which is standard equipment in all rubber mills. If desired, the entire mass of fibre may be added at one time, since the consistensy of the rubber is such as to permit a thorough dissemination and absorption of the fibre by the rubber mass, or the addition of the fibre may take place in steps. Larger quantities of fibre can be effectively bonded by this process than by some of the other processes now in extensive use, for example, by the process of the present invention the final product may readily contain from fifty-five per cent. and upwards to seventy-five per cent. of fibre by weight. Rubber which has not been heat treated, as well as coloring material, fillers and vulcanizing materials, may be added to the fibre-rubber mass during the mixing in the Banbury mixer, or these materials may be incorporated with the rubber during the latter processing, for example, on a rubber mill if desired. In the mixing operation, the individual fibres are thoroughly impregnated and coated with the viscous rubber mass and an entirely homogeneous and closely combined mixture results.

Suitable formulæ for use in compounding are illustrated in the three following examples, the proportions of material of which may be varied to suit particular conditions:

|  | Formula A | Formula B | Formula C |
|---|---|---|---|
| Crude rubber | 15.9 | 6.4 | 0.0 |
| Heat treated rubber | 9.9 | 12.8 | 15.9 |
| Asbestos fibre | 55.4 | 63.9 | 67.1 |
| Cotton fibre | 6.0 | 2.9 | 2.7 |
| Lime | 0.8 | 1.1 | 1.4 |
| Graphite | 4.1 | 3.4 | 3.2 |
| Sulphur | 7.9 | 9.5 | 9.7 |
|  | 100.0 | 100.0 | 100.0 |

The rubber fibre mass after it has been thoroughly mixed may then be processed in any desired manner such as the well known methods now employed in the production of rubber articles. For example, it may be transferred to a sheeter, where it is formed into sheets of the required thickness in the usual manner. These relatively flexible sheets are then divided into strips or other form suitable for the particular purpose for which the final product is to be used and vulcanized to obtain the desired shape and degree of hardness. I continue the vulcanization to the point approaching the maximum tensile strength, for example, with the three formulæ given above, I employ a temperature of 324° F. for twelve minutes. In the manufacture of brake lining and other materials contemplated herein, I am concerned with hard rubber manufacture, and, therefore, types of rubber may be employed in the present invention which might not answer the requirements of soft rubber.

Referring again to the drawing, in Figure 1, the disadvantages of compounds using softeners or plasticizers are clearly evident. The vertical scale represents wattage used by the machine which tests the friction disks, brake bands, or clutch rings for coefficient of friction, the wattage obviously being directly proportional to the coefficient of friction. The horizontal scale represents the length of time of the tests in hours. Curve A represents a friction disk prepared in accordance with the present invention; while curves B and C represent friction disks employing softeners and plasticizers. It will be noted that the curve A has a uniform coefficient of friction throughout the duration of the test; while both curves B and C have a relatively low and uneven coefficient of friction until the test has been continued for some time. These curves clearly show the self-lubrication of the materials containing softeners, plasticizers and the like. No self-lubrication is found in the frictions disks of applicant's invention.

Figure 2 serves to bring out certain points relative to the effect of time of curing upon the rubber-sulphur mixtures of the present invention. The theory has been advanced that there are two separate reactions between rubber and sulphur, one in which sulphur adds to the end of the rubber molecule, and the other in which the rubber molecule is completely saturated with sulphur. The former reaction is referred to as the soft rubber reaction. They, however, often take place simultaneously. So far as the product of the present invention is concerned when using the heat-treated rubber described herein, it makes little or no difference which course the reaction between sulphur and rubber may take, as the vulcanization is carried on to produce the articles contemplated herein to the end point of maximum saturation, and the present invention is not concerned with the presence or absence of "nerve" or the like in the rubber. In the manufacture of friction disks, such as brake lining manufacture or the like, sections A and B of the curve and beyond towards C are of interest, and the section of the curve below A need not be taken into consideration.

In the claims, I refer to friction disks as including all material for friction services, for example, brake bands, clutch rings, and the like. The heat-treated rubber having honey-like consistency is referred to in the claims as viscous rubber.

It is to be understood that the temperature and length of time of treatment given above are merely illustrative and may vary widely, the novel feature of the invention residing in the reduction or breaking down of the rubber to a viscous mass of relatively low viscosity by treatment at relatively high temperatures for sufficient periods of time and the addition of the fibres to the rubber mass while in this condition. It has been found that the heat treatment has no adverse effect whatever on the resulting hard rubber and by the simple process of the invention an end product is obtained which not only carries a relatively large amount of fibre, but which is a more satisfactory product in many respects, since it lacks the deteriorating and undesirable effects of softeners and plasticizers previously used in an attempt to incorporate fibre in the rubber.

I claim:

1. Rubber-fibre friction disks comprising vulcanized hard rubber approaching maximum saturation of the sulphur in the mix by the rubber containing a uniform distribution of fibres impregnated with vulcanized viscous crude rubber and intimately mixed therewith.

2. Rubber-fibre friction disks comprising vulcanized hard rubber approaching maximum saturation of the sulphur in the mix by the rubber containing a uniform distribution of asbestos fibres impregnated with vulcanized viscous crude rubber and intimately mixed therewith.

3. Rubber-fibre friction disks comprising vulcanized hard rubber approaching maximum saturation of the sulphur in the mix by the rubber containing a uniform distribution of fibres impregnated with vulcanized viscous crude rubber and intimately mixed therewith and present in an amount by weight in excess of 60% of the total product.

4. Rubber-fibre friction disks comprising vulcanized hard rubber approaching maximum saturation of the sulphur in the mix by the rubber containing a uniform distribution of asbestos fibres impregnated with vulcanized viscous crude rubber and intimately mixed therewith and present in an amount by weight in excess of 60% of the total product.

5. The method of making friction disks which comprises heating unvulcanized rubber at a temperature and for a time sufficient to render it viscous, but insufficient to cause decomposition, mixing said viscous rubber with fibres and sulphur, shaping said rubber mix to form friction disks, and thereafter vulcanizing said friction disks to a point approaching the maximum tensile strength of the rubber and the maximum saturation point of the sulphur by the rubber.

6. The method of making friction disks which comprises heating unvulcanized rubber at a temperature and for a time sufficient to render it viscous, but insufficient to cause decomposition, mixing said viscous rubber with asbestos fibres and sulphur, shaping said rubber mix to form friction disks, and thereafter vulcanizing said friction disks to a point approaching the maximum tensile strength of the rubber and the maximum saturation point of the sulphur by the rubber.

7. The method of making friction disks which comprises heating unvulcanized rubber at a temperature of from 350 degrees F. to 550 degrees F. and for a sufficient time to render it viscous, but insufficient to cause decomposition, mixing said viscous rubber with fibres and sulphur, shaping said rubber to form friction disks, and thereafter vulcanizing said friction disks to a point approaching the maximum tensile strength of the rubber and the maximum saturation point of the sulphur by the rubber.

8. The method of making friction disks which comprises heating unvulcanized rubber at a temperature of from 350 degrees F. to 550 degrees F. and for a sufficient time to render it viscous, but insufficient to cause decomposition, mixing said viscous rubber with asbestos fibres and sulphur, shaping said rubber mix to form friction disks, and thereafter vulcanizing said friction disks to a point approaching the maximum tensile strength of the rubber and the maximum saturation point of the sulphur by the rubber.

9. The method of making friction disks which comprises heating unvulcanized rubber at a temperature and for a time sufficient to render it viscous, but insufficient to cause decomposition, mixing said viscous rubber with fibres and sulphur, said fibres comprising an excess of 60 per cent of the final product by weight, shaping said rubber mix to form friction disks, and thereafter vulcanizing said friction disks to a point approaching the maximum tensile strength of the rubber and the maximum saturation point of the sulphur by the rubber.

10. The method of making friction disks which comprises heating unvulcanized rubber at a temperature and for a time sufficient to render it viscous, but insufficient to cause decomposition, mixing said viscous rubber with asbestos fibres and sulphur, said fibres comprising an excess of 60 per cent of the final product by weight, shaping said rubber mix to form friction disks, and thereafter vulcanizing said friction disks to a point approaching the maximum tensile strength of the rubber and the maximum saturation point of the sulphur by the rubber.

11. The method of making friction disks which comprises heating unvulcanized rubber at a temperature and for a time sufficient to make it viscous, but insufficient to cause decomposition, mixing said viscous rubber with fibres, ordinary non-viscous rubber and sulphur, shaping said rubber mix to form friction disks, and thereafter vulcanizing said friction disks to a point approaching the maximum tensile strength of the rubber and the maximum saturation point of the sulphur by the rubber.

12. The method of making friction disks which comprises heating unvulcanized rubber at a temperature and for a time sufficient to make it viscous, but insufficient to cause decomposition, mixing said viscous rubber with asbestos fibres, ordinary non-viscous rubber and sulphur, shaping said rubber mix to form friction disks, and thereafter vulcanizing said friction disks to a point approaching the maximum tensile strength of the rubber and the maximum saturation point of the sulphur by the rubber.

13. The method of making friction disks which comprises subjecting unvulcanized rubber to heat and pressure for a time sufficient to render it viscous, but insufficient to cause decomposition, mixing said viscous rubber with fibres and sulphur, shaping said rubber mix to form friction disks, and thereafter vulcanizing said friction disks to a point approaching the maximum tensile strength of the rubber and the maximum saturation point of the sulphur by the rubber.

14. The method of making friction disks which comprises subjecting unvulcanized rubber to heat and pressure for a time sufficient to render it viscous, but insufficient to cause decomposition, mixing said viscous rubber with asbestos fibres and sulphur, shaping said rubber mix to form friction disks, and thereafter vulcanizing said friction disks to a point approaching the maximum tensile strength of the rubber and the maximum saturation point of the sulphur by the rubber.

RAYMOND W. KENT.